(12) United States Patent
Watkins

(10) Patent No.: US 8,312,461 B2
(45) Date of Patent: Nov. 13, 2012

(54) SYSTEM AND METHOD FOR DISCOVERING AND PROTECTING ALLOCATED RESOURCES IN A SHARED VIRTUALIZED I/O DEVICE

(75) Inventor: John E. Watkins, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 1192 days.

(21) Appl. No.: 12/135,356

(22) Filed: Jun. 9, 2008

(65) Prior Publication Data

US 2009/0307702 A1 Dec. 10, 2009

(51) Int. Cl.
G06F 3/00 (2006.01)
G06F 12/02 (2006.01)
G06F 13/14 (2006.01)
G06F 12/00 (2006.01)
G06F 13/16 (2006.01)
G06F 12/06 (2006.01)

(52) U.S. Cl. ............... 718/104; 718/1; 714/53; 714/768; 714/743; 711/207; 711/E12.084; 710/5; 710/36; 710/200; 710/240; 709/224

(58) Field of Classification Search .................. 718/104; 714/53, 768, 743; 710/36; 709/224
See application file for complete search history.

(56) References Cited

U.S. PATENT DOCUMENTS

| | | | |
|---|---|---|---|
| 6,519,678 B1 * | 2/2003 | Basham et al. | 711/112 |
| 6,763,454 B2 * | 7/2004 | Wilson et al. | 713/1 |
| 7,181,743 B2 * | 2/2007 | Werme et al. | 718/104 |
| 7,664,110 B1 * | 2/2010 | Lovett et al. | 370/392 |
| 7,765,521 B2 * | 7/2010 | Bryant | 717/103 |
| 2004/0167996 A1 | 8/2004 | Takamura et al. | |
| 2005/0076155 A1 * | 4/2005 | Lowell | 710/1 |
| 2006/0143617 A1 * | 6/2006 | Knauerhase et al. | 718/104 |
| 2007/0240161 A1 * | 10/2007 | Prabhakar et al. | 718/104 |
| 2008/0288661 A1 * | 11/2008 | Galles | 710/3 |
| 2010/0306416 A1 * | 12/2010 | Watkins | 710/5 |

OTHER PUBLICATIONS

U.S. Appl. No. 12/256,250, filed Oct. 22, 2008; Entitled: "Mechanism for Performing Function Level Reset in an I/O Device" First named inventor: Rahoul Puri.

U.S. Appl. No. 12/471,637, filed May 26, 2009; Entitled: "System and Method for Discovering and Protecting Shared Allocated Resources in a Shared Virtualized I/O Device" First named inventor: John E. Watkins.

(Continued)

Primary Examiner — Meng An
Assistant Examiner — Abu Z Ghaffari
(74) Attorney, Agent, or Firm — Meyertons, Hood, Kivlin, Kowert & Goetzel, P.C.; Stephen J. Curran

(57) ABSTRACT

A system includes a virtualized I/O device coupled to one or more processing units. The virtualized I/O device includes a storage for storing a resource discovery table, and programmed I/O (PIO) configuration registers corresponding to hardware resources. A system processor may allocate the plurality of hardware resources to one or more functions, and to populate each entry of the resource discovery table for each function. The processing units may execute one or more processes. Given processing units may further execute OS instructions to allocate space for an I/O mapping of a PIO configuration space in a system memory, and to assign a function to a respective process. Processing units may execute a device driver instance associated with a given process to discover allocated resources by requesting access to the resource discovery table. The virtualized I/O device protects the resources by checking access requests against the resource discovery table.

15 Claims, 3 Drawing Sheets

OTHER PUBLICATIONS

U.S. Appl. No. 12/355,856, filed Jan. 19, 2009; Entitled: "Method and System for Reducing Address Space for Allocated Resources in a Shared Virtualized I/O Device" First named inventor: John E. Watkins.

* cited by examiner

SYSTEM AND METHOD FOR DISCOVERING AND PROTECTING ALLOCATED RESOURCES IN A SHARED VIRTUALIZED I/O DEVICE

BACKGROUND OF THE INVENTION

1. Field of the Invention

This invention relates to computer systems and, more particularly, to shared input/output (I/O) resources.

2. Description of the Related Art

There have been significant increases in the effective throughput of a variety of I/O devices used in computing systems. In the recent past, a number of new communication standards have been introduced. For example, 10 Gigabit Ethernet and PCI Express standards allow tens of gigabits of information to be conveyed. In many computer systems, a single processor or processing module typically does not use that much I/O bandwidth. Accordingly, in an effort to increase hardware resource utilization, sharing of I/O hardware resources may be desirable.

SUMMARY

Various embodiments of a system and method for discovering and protecting allocated resources in a shared virtualized input/output (I/O) device are disclosed. In one embodiment, the system includes a virtualized I/O device coupled to one or more processing units and to a system processor. The virtualized I/O device includes a storage configured to store a resource discovery table. The virtualized I/O device also includes one or more programmed I/O (PIO) configuration registers corresponding to a plurality of hardware resources. The system processor may be configured to execute system management instructions to allocate the plurality of hardware resources to one or more functions, and to populate each entry of the resource discovery table for each function. The one or more processing units may be configured to execute instructions corresponding to one or more processes. Given processing units may be further configured to execute operating system (OS) instructions to allocate address space for an I/O mapping of a PIO configuration space in a system memory, and to assign a function to a respective process executing on the processing units. Given processing units may be further configured to execute instructions corresponding to a device driver instance associated with a given process to discover allocated resources by requesting a read access to the resource discovery table of the corresponding function.

In another embodiment, a method includes allocating hardware resources to one or more functions, and populating a resource discovery table for each function of the one or more functions. The method also includes generating an input/output (I/O) map of a configuration space in a system memory, and assigning a function to a respective process executing on a processor. The method may further include a device driver associated with a given respective process discovering allocated resources by requesting a read access to the resource discovery table of the corresponding function, and storing results of the read access.

Figure 1:
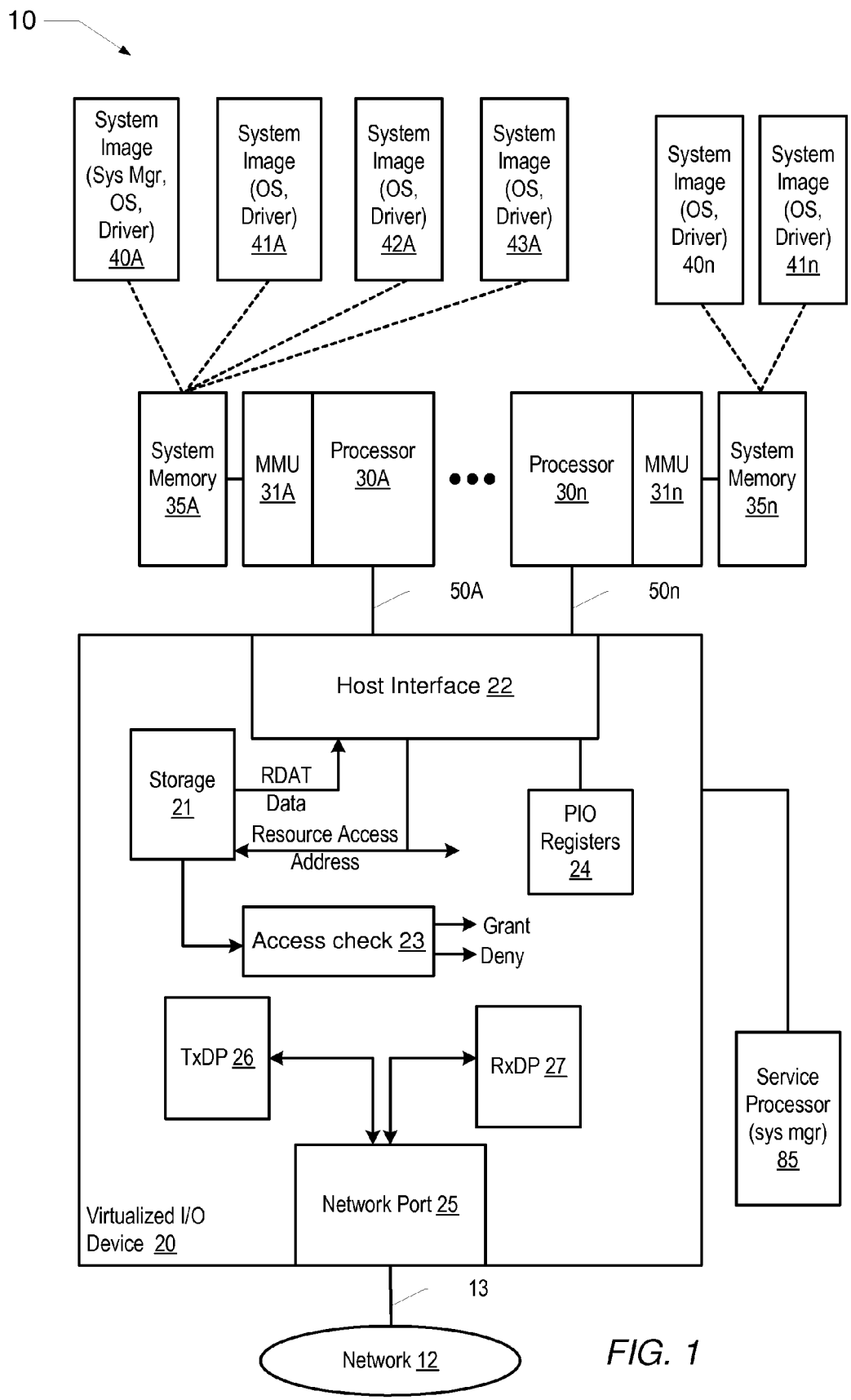
FIG. 1 is a block diagram of one embodiment of a computer system including a shared virtualized I/O device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

As mentioned above, sharing of I/O hardware resources may be desirable in some systems. Thus, I/O virtualization standards have been introduced. However, there are issues with virtualizing and sharing of hardware resources. More particularly, one issue is the data and resources of each process must be protected from access by any other process. Another issue is that each process should have the perception that it is the sole user of the hardware resource. Thus, as described below, a virtualized I/O device may be used to share a relatively high cost hardware component among a number of user processes. In addition, using the virtualized I/O device, each process has a way to discover which resources have been allocated to it, and the data of each process is protected. Further, the virtualized I/O device may provide an environment in which each process may have little or no knowledge that it is sharing the hardware with another process. Lastly, each process may use an instance of a common device driver to discover and access allocated resources.

Turning now to FIG. 1, a block diagram of one embodiment of a computer system 10 including a virtualized I/O device 20 connected to a network 12 is shown. Computer system 10 includes a plurality of processors designated 30A and 30n, where n may be representative of any number. As shown, the processors 30A and 30n are coupled to the virtualized I/O device 20. The virtualized I/O device 20 is coupled to a network 12, and to a service processor 85. As shown, processor 30A is also coupled to a memory management unit, designated MMU 31A, which is in turn coupled to a system memory 35A. Similarly, processor 30n is coupled to MMU 31n and system memory 35n. It is noted that components having reference designators with a number and letter may be referenced by just the number where appropriate.

In one embodiment, each of the processors 30 may be representative of any type of processing unit including a single processor, a chip multiprocessor that includes multiple central processing units (CPUs) on a single substrate, or a processing node such as a blade processing unit or blade server, for example, which may include one or more CPUs in a single housing.

In the illustrated embodiment, the MMU 31 may be configured to control accesses to system memory 35A, as well as manage memory and cache coherency functionality. Further, in one embodiment, MMU 31 may be configured to grant or deny accesses to certain addresses within a programmed I/O (PIO) configuration space by device drivers, dependent upon whether the requesting device driver has been allocated the requested address space.

System memory 35 may be representative of any type of memory medium. For example, in various embodiments, system memory 35 may be implemented using memory devices in the dynamic random access memory (DRAM) family of devices. However, system memory 35 may also be implemented using static RAM (SRAM) or other types of storage devices as desired. System memory 35 may be used to store program instructions, which may be fetched and executed by the processors 30A and 30n.

More particularly, as shown in FIG. 1, a number of system images designated 40A -43A and 40n through 41n may be stored within system memory 35A and system memory 35n, respectively, as denoted by the dotted lines. Each of the system images may be representative of an instance of system software that is running on a given CPU within processor 30A. For example, the system image may include an operating system instance, a device driver instance, as well as any other system level software executing on a processing unit. In addition, there may be several instances of a device driver executing on a given CPU. For example, as described in greater detail below, a CPU may be running several processes, each requiring I/O hardware resources within the virtualized I/O device 20. In one embodiment, each of those processes may have its own device driver instance that may be used to discover and access the respective hardware resources that have been assigned to each respective process.

In the illustrated embodiment, the virtualized I/O device 20 includes a network port 25 that is coupled to the network 12 via a network link.13. The virtualized I/O device 20 also includes a host interface 22 that is coupled to a storage 21 and to PIO registers 24. The storage 21 is coupled to an access check unit 23. In addition, the virtualized I/O device 20 includes a transmit data path designated TxDP 26 and a receive datapath designated RxDP 27. In various embodiments, the RxDP 27 may include filtering and classification, and scheduling functionality, among others. The TxDP 26 circuits may include arbitration and scheduling functionality. It is noted that virtualized I/O device 20 may also include a variety of other circuits that have been omitted here for simplicity. For example, in various embodiments, virtualized I/O device 20 may include, a bus interface for connection to the service processor 85. It is noted that in one embodiment, storage 21 is not accessible to devices outside of virtualized I/O device 20. As described further below, in one embodiment storage 21 may be configured as limited access storage for storing resource discovery and allocation information, which may only be accessible by the host interface 22 and access check unit 23.

The network port 25 may provide a connection to the network 12 using a network protocol. In one embodiment, the network 12 may be any of a variety of frame-based protocols such as the Ethernet protocol. As such, the network connection may be a 10-Gigabit Ethernet (10 GE) connection. Accordingly, network port 25 may be configured to provide a cable or optical interface, as well as other network functions such as medium access control (MAC) functions, physical (PHY) layer functions, and physical coding sublayer (PCS) functionality (all not shown). It is noted that in other embodiments, other network protocols may be supported.

In one embodiment, the host interface 22 may include a plurality of I/O interfaces (not shown) that may be representative of peripheral component interconnect (PCI) express (PCIe) compliant physical interfaces, each representing a PCIe endpoint. As such each of the links (e.g., 50A and 50n) may be PCIe links that include a number of lanes. In addition, each I/O interface may be independently configurable by the service processor. Further, the host interface 22 may provide a shared set of resources (e.g., MAC, statistics and control, DMA channels, PIO configuration space) that allow each processor 30 to substantially transparently share the network port 25. The PIO registers unit 24 includes number of configuration and status registers, and supports memory mapped I/O posted and non-posted transactions. Each I/O interface may be independently programmed and controlled by the processing unit 30 to which it is connected.

Accordingly, the virtualized I/O device 20 may provide a flexible number of I/O resources to a number of processes executing on the processing units 30. In one embodiment, the service processor 85 may determine and allocate the hardware resources of the virtualized I/O device 20 among the processes during an initialization of computer system 10. The virtualized I/O device 20 may be configured to provide a measure of protection for the allocated resources such that no process may either accidentally or otherwise access the resources that have been allocated to another process.

More particularly, to enable a device driver that has been assigned to a given process to discover which resources have been allocated to it, and to prevent that driver from access in resources that have been allocated to another process, resource discovery and allocation tables (e.g., RDAT 225A and 225C shown in FIG. 2) may be stored within storage 21. In addition, access check unit 23 may be configured to check access requests against the settings in the RDAT 225, and to either grant or deny access to requested resources dependent on the RDAT settings for the requesting process.

An I/O device such as the virtualized I/O device 20, for example, needs to be identified by the O/S, enumerated within the overall I/O device tree constructed by the O/S, allocated memory space, granted a unique access identification, provided interrupt mechanisms, and allocated various other resources in order to efficiently bind the service provided by the device into the overall system. Accordingly, a function is a hardware construct consisting of a set of purpose-specific registers built into an I/O device which standardizes the way a device presents its capabilities and resource requests to system software. Some of the registers may identify device capabilities and resource requests, while other registers may be used by S/W to allocate resources to the device. Additional registers may provide status and error management tools. A function provides this information and control capability in a standardized way independent of the service provided by the I/O device. Some non-virtualized I/O devices may have as few as one function, while a highly virtualized device may contain many functions, and may have a function allocated to each active system image sharing the device. A base address register (BAR) may be used by a function to indicate to the O/S when it reads the BAR the amount of memory space the application requires. Should the O/S grant that request, it writes into the BAR an address which represents the starting location within the overall address map where the O/S has allocated the address space needed by the application. The device driver affiliated with the function uses that as the base address to access resources contained within the device.

Figure 2:
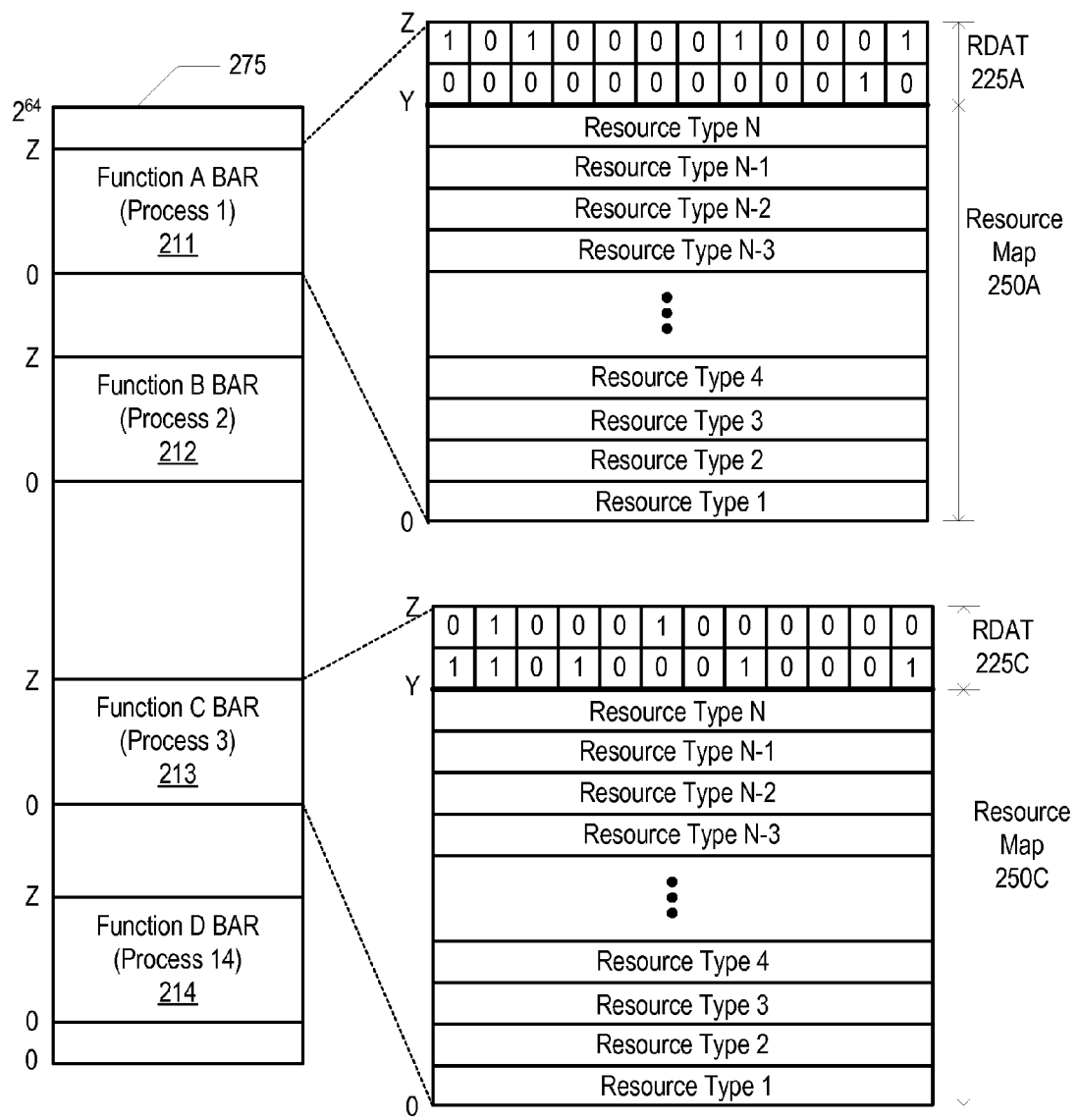
FIG. 2 is a diagram illustrating an embodiment of an I/O map and a corresponding resource discovery table created during resource discovery.

In one embodiment, the host interface 22 may support a number of functions. The hardware resources may be divided up among the functions in an arbitrary manner. However, in one embodiment, the resource allocation may be determined by the service processor 85. Each process executing on processors 30 may be associated with a device driver instance which may be configured to discover which resources have been allocated to the associated process and to access the resources when invoked by the process. It is noted that a function refers to an addressable entity in configuration space that may provide access to one or more hardware resources. As described further below, each function may be associated with one process, and therefore one device driver that corresponds to that process. In one embodiment, a number of resources may be allocated to a function based upon the base address register settings for that function. As shown in FIG. 2 and mentioned above, the resources that have been allocated to a given process/function pair may be indicated in the RDAT 225.

Referring to FIG. 2, a diagram illustrating an embodiment of the data structures used in association with the virtualized I/O device 20 of FIG. 1 are shown. The I/O map 275 represents a conceptual illustration of how the functions within the virtualized I/O device 20 may be arranged in the system address space. The I/O map 275 includes a number of functions designated 211 through 214. Each function is associated with a process that may be running on, for example, one or both processors 30A and 30n of FIG. 1. In the illustrated embodiment, the address space of the I/O map 275 is shown to have a size of $2^{64}$ bytes. It is noted that in other embodiments that size of the address space for the I/O map 275 may be different. Within the I/O map 275, each function is shown to have 0-Z addressable locations. However, as described further below, only locations 0-Y may be directly addressable. As shown in the exploded views of Function A BAR 211 and Function C BAR 213, the resources maps 250A and 250C, respectively, include a listing of hardware resources of the virtualized I/O device 20. In FIG. 2, the resource map 250, like the I/O map 275, is a conceptual illustration of the listing of resources that are potentially available to a given function. Each driver inherently knows where these resources are (i.e., the address in the address space defined by the I/O map 275) any of the particular resources are allocated to a given process. The resource map 250 corresponds to locations 0-Y of each function BAR.

As described above, resources that have been allocated to a given process are indicated in the RDAT 225 for each function BAR. Each bit position in the RDAT 225 corresponds to a particular resource. In addition, since all function BARs are part of the $2^{64}$-byte address space, each bit in the RDAT 225 corresponds to a portion of that space. Thus when a given bit in the RDAT 225 is asserted to indicate that a particular resource has been allocated to that process, the driver is informed of the address it must use to access that resource relative to the base address of the region specified in the BAR of the function that the driver was assigned. In the illustrated embodiment, the RDAT 225A and RDAT 225C each include two rows of 12 bits for a total of 24 locations, although other numbers of locations may be used. In one embodiment, a bit that is asserted to a logic value of one, indicates that the resource in the resource map 250 that corresponds to that bit, has been allocated to the respective process. For example, as shown in the RDAT 225A, beginning from the right side of row Y, bit locations 1, 12, 16, 21, and 23 are set. In the illustrated embodiment, those bit positions may correspond to resource types 2, 13, 17, 22, and 24. Similarly, within RDAT 225C, bit positions 0, 4, 8, 10, 11, 18, and 22 are set, which may correspond to resource types 1, 5, 9, 11, 12, 19, and 23. It is noted that in other embodiments, other logic values may be used to indicate which resources have been allocated. For example, a logic value of zero may be used, or in other embodiments, the RDAT 225 may include more than one bit for each resource, and the bits may be encoded with values representing the resources. In addition, it is noted that the additional bits may be used to indicate whether the respective process has read-only or both read and write privileges for a given resource.

As described above, each RDAT 225 may be stored within storage 21 of the virtualized I/O device. As such, the host interface 22 and/or the access check unit 23 may access the RDAT 225 to perform such tasks as allocation, discovery, and/or protection of resources as described further below in conjunction with the description of FIG. 3. Since the system inherently knows where in the $2^{64}$-byte address space each function BAR is located, the memory manager may control access to specific addresses by a particular device driver, allowing access only to a device driver that has been assigned to the requested address space. In one embodiment, the RDAT 225 is not accessible through a memory access. In such an embodiment, the host interface 22 may be solely responsible for reading the RDAT 225 and providing a response to a device driver request.

Figure 3:
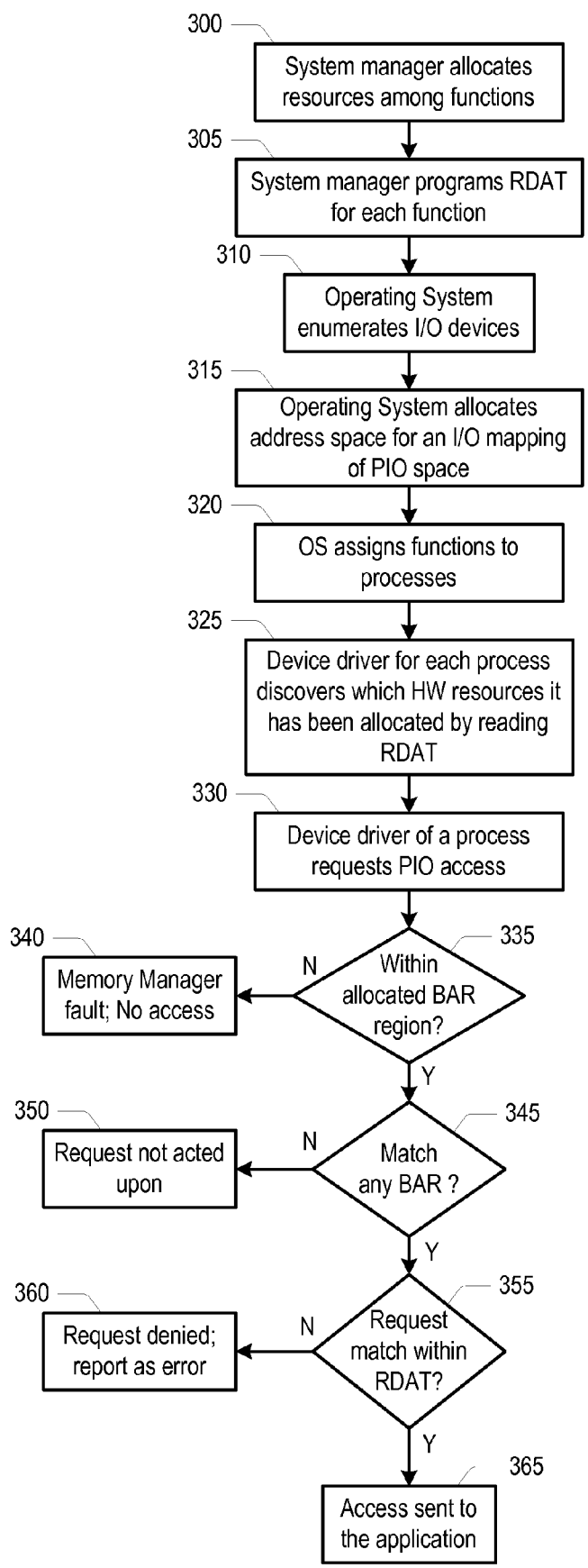
FIG. 3 is a flow diagram describing aspects of the discovery and protection of allocated resources within the virtualized I/O device shown in FIG. 1.

In FIG. 3, a flow diagram describing the operation of the embodiment of the computer system 10 of FIG. 1 is shown. Referring collectively to FIG. 1 through FIG. 3, the discovery and protection of I/O resources is described. Beginning with block 300, during system initialization, a system manager allocates resources among the functions. In one embodiment, the system manager may be the service processor 85. However, it is contemplated that in other embodiments, the system manager may be implemented as another dedicated processor or processing unit that may be configured to allocate the system resources. Accordingly, as part of the allocation process, the system manager programs the RDAT 225 for each function by, as described above, setting or otherwise asserting the bits that correspond to each allocated resource (block 305).

An operating system (OS) instance may enumerate the I/O devices in the system (block 310). In one embodiment, the enumeration process may include the OS identifying each I/O device and function in the system. The OS instance may build the I/O device tree, and allocate the address space for the functions such as those shown in the I/O map 275, which includes the programmed I/O (PIO) configuration space (block 315). As shown in FIG. 2, the address space corresponding to the I/O map 275 may be broken up into a number of address spaces, each space including a function BAR for each function, which includes the available resources for that function. The OS may then assign the functions to the various processes running on the processors 30A and 30n (block 320). In one embodiment, each function may be identified by a unique ID.

Each process may be associated with a respective device driver. In one embodiment, the device driver is an instance of device driver software that may be used by all the processes. The device driver may use read and write operations through load and store operations to discover and access the resources within the virtualized I/O device 20. Thus, each device driver associated with a process may discover which resources have been allocated to each process (block 325). In one embodiment, a given device driver may initiate a read operation to the RDAT 225 for the function to which the process has been assigned. As described above, the host interface 22 may access the appropriate RDAT 225, and provide a response back to the driver. The response includes the resources that have been allocated to the process. The driver now has the addresses and information to access those resources.

Accordingly, when a given process needs to access the resources that it has been allocated, the device driver of that process requests a PIO access (block 330). The memory manager (e.g., MMU 31A) checks the address associated with the request to determine if the address is within the address range for the function BAR region that has been assigned to the requesting process (block 335). If the address is not within the address range for the assigned function BAR region, the memory manager will prevent the driver from accessing resources allocated to another process by generating a fault.

The memory manager may drop the access request (block 340). However, if the address is within the address range for the assigned function BAR region, the memory manager will allow the access to proceed.

The host interface 22 may check the access request to ensure that the request matches a valid BAR within the virtualized I/O device 20 (block 345), and if not, the host interface 22 may not act upon the request, and then issue an 'Unsupported Request" (block 350). If the access request matches a BAR, the host interface 22 may access the RDAT 225 of the function which contains the matching BAR. The contents of the RDAT 225 may be inspected by the access check unit 23 to determine whether the device driver has been allocated the requested resources, and thus the access is permitted (block 355). If the access check unit 23 determines, using the contents of the RDAT 225, that the access is not permitted, the requested access is denied (block 360). In one embodiment, the access check unit 23 may provide a deny signal as a flag that the request is an error. The flag may cause the virtualized I/O device to perform any type of error processing, as desired. Some examples of error processing may include generating one or more interrupts, completer abort by the PCIe, returning zeros in response to a read request, discarding a write request, and the like. Referring back to block 355, if the access check unit 23 determines that the access is permitted, the access is granted and sent back to the process (block 365).

It is noted the although the above embodiments show the virtualized I/O device coupled between processing units and a network, it is contemplated that in other embodiments, the virtualized I/O device may be a shared virtualized device used in any system. In such embodiments, the shared virtualized device may use the discovery and allocation mechanisms described above to allocate and share resources among a number of entities.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    a system processor allocating hardware resources in a resource map to one or more functions associated with an input/output (I/O) device, wherein each of the one or more functions is associated with a corresponding resource discovery table;
    wherein each corresponding resource discovery table includes a plurality of entries, wherein each entry has a one to one correspondence to a respective location within the resource map, and wherein each respective location is associated with a respective hardware resource;
    allocating address space in a system memory to each function of the one or more functions thereby creating an (I/O) mapping of a programmed I/O (PIO) configuration space;
    assigning a given function of the one or more functions to a respective process executing on a processor;
    wherein the allocating the hardware resources includes populating each entry of each corresponding resource discovery table with a value, wherein the value indicates whether the corresponding respective hardware resource has been allocated to the respective process; a device driver running on the processor and associated with a given respective process discovering which of the hardware resources have been allocated to the device driver by performing a PIO resource request to the resource discovery table of the associated function for access to a given hardware resource;
    generating a fault in response to an address of the PIO resource request not being within an address region of the address space of the system memory that has been allocated to the function assigned to the process performing the PIO resource request; and
    the device driver storing results of the PIO resource request.

2. The method as recited in claim 1, further comprising disregarding the PIO resource request in response to an address of the PIO resource request being within an address region of the address space of the system memory that has been allocated to the function assigned to the process performing the PIO resource request, and the address of the PIO resource request not matching a base address register address associated with any function of the one or more functions.

3. The method as recited in claim 2, further comprising in response to an address of the PIO resource request matching the base address register address associated with any function, determining whether an access to the resource is permitted by inspecting the resource discovery table of the associated function corresponding to the matching base address register.

4. The method as recited in claim 3, further comprising in response to determining that an access to the resource is not permitted, generating an error and notifying the process performing the PIO resource request that the request has been denied.

5. The method as recited in claim 1, wherein the value within each entry of the resource discovery table, when asserted, indicates the requested hardware resource has been allocated to the requesting process.

6. The method as recited in claim 1, wherein the populating each entry of each corresponding resource discovery table with a value includes encoding a plurality of bits to indicate whether the requesting process has read-only or read and write privileges to the respective hardware resource corresponding to the entry.

7. The method as recited in claim 1, wherein the device driver is an instance of a common design device driver that is useable by any process to discover and request access to the hardware resources.

8. A system comprising:
    a virtualized input/output (I/O) device including:
        one or more programmed I/O (PIO) configuration registers corresponding to a plurality of hardware resources within a resource map of the virtualized I/O device; and
        a storage configured to store one or more resource discovery tables, each resource discovery table having a plurality of entries, wherein each entry has a one to one correspondence to a respective location within the resource map, and wherein each respective location is associated with a respective hardware resource;
    a system processor coupled to the virtualized I/O device and configured to execute system management instructions to
        allocate the plurality of hardware resources to one or more functions associated with the I/O device, wherein each of the one or more functions is associated with a corresponding resource discovery table; and
    one or more processing units coupled to the virtualized I/O device and configured to execute instructions corresponding to one or more processes, wherein each PIO configuration register is configured to store PIO configuration information corresponding to a respective process executing on the one or more a processing units;

wherein given ones of the one or more processing units are further configured to execute operating system (OS) instructions to:

allocate address space in a system memory to each function of the one or more functions to create an I/O mapping of a PIO configuration space;

assign a given function of the one or more functions to a respective process executing on the one or more processing units;

wherein the system processor is further configured to populate each entry of each corresponding resource discovery table with a value, wherein the value indicates whether the corresponding respective hardware resource has been allocated to the respective process;

wherein given ones of the one or more processing units are further configured to execute instructions corresponding to a device driver instance associated with a given process to discover which of the hardware resources have been allocated to the given process by performing a PIO resource request to the resource discovery table of the associated function for access to a given hardware resource; and a memory management unit coupled to at least one of the one or more processors and configured to generate a fault in response to an address of the PIO resource request not being within an address region of the address space of the system memory that has been allocated to the function assigned to the process performing the PIO resource request.

9. The system as recited in claim 8, wherein the virtualized I/O device further includes a host interface configured to disregard the PIO resource request in response to an address of the PIO resource request being within an address region of the address space of the system memory that has been allocated to the function assigned to the process performing the PIO resource request, and not matching a base address register address associated with any function of the one or more functions.

10. The system as recited in claim 9, wherein the virtualized I/O device includes an access check unit configured to inspect the resource discovery table associated with the function corresponding to the matching base address register to determine whether an access to the given hardware resource is permitted.

11. The system as recited in claim 10, wherein in response to determining the access to the given hardware resource is not permitted, the host interface is configured to generate an error and to notify the process performing the PIO resource request that the request has been denied.

12. The system as recited in claim 8, wherein the value within each entry of the resource discovery table, when asserted, indicates the requested hardware resource has been allocated to the requesting process.

13. The system as recited in claim 8, wherein the value within each entry of the resource discovery table includes one or more bits encoded to indicate whether the requesting process has read-only or read and write privileges to the resource corresponding to the entry.

14. The system as recited in claim 8, wherein the device driver is an instance of a common design device driver that is useable by any process to discover and request access to the hardware resources.

15. A virtualized input/output (I/O) device comprising:
a host interface;
a plurality of hardware resources included within a resource map and coupled to the host interface;
a storage coupled to the host interface and configured to store a plurality of resource discovery tables, each including a plurality of entries, wherein each of the resource discovery tables is associated with a function of a plurality of functions associated with the virtualized I/O device;
wherein each of the resource discovery table entries has a one to one correspondence to a respective location within the resource map, and wherein each respective location is associated with a respective hardware resource;
one or more programmed I/O (PIO) configuration registers, each configured to store PIO configuration information corresponding to a respective process executing on a processing unit;
wherein the host interface is configured to receive from a device driver instance executing on the processing unit and associated with a given respective process, a PIO request for read access to the respective resource discovery table associated with the function that has been assigned to the given respective process for access to a given hardware resource;
wherein in response to receiving the PIO request for read access, the host interface is further configured to inspect a value within each entry of the respective resource discovery table associated with the function that has been assigned to the given respective process to determine whether an access by the given respective process to the given hardware resource is permitted; and
wherein the host interface is further configured to disregard the PIO request for read access in response to an address of the PIO request for read access:
being within an address region of an address space of the system memory that has been allocated to the function assigned to the given respective process associated with the device driver instance performing the PIO resource request, and not matching a base address register address associated with any function of the one or more functions.

* * * * *